(12) United States Patent
Norton

(10) Patent No.: US 7,395,422 B2
(45) Date of Patent: Jul. 1, 2008

(54) METHOD AND SYSTEM OF CHANGING A STARTUP LIST OF PROGRAMS TO DETERMINE WHETHER COMPUTER SYSTEM PERFORMANCE INCREASES

(75) Inventor: James B. Norton, Pinehurst, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 421 days.

(21) Appl. No.: 11/105,218

(22) Filed: Apr. 13, 2005

(65) Prior Publication Data

US 2006/0236085 A1    Oct. 19, 2006

(51) Int. Cl.
  G06F 1/24    (2006.01)
  G06F 9/00    (2006.01)
  G06F 9/24    (2006.01)
  G06F 15/177    (2006.01)
(52) U.S. Cl. ............................... 713/2; 713/1; 713/100
(58) Field of Classification Search ....................... 713/2
  See application file for complete search history.

(56) References Cited

U.S. PATENT DOCUMENTS

| 7,243,245 | B2* | 7/2007 | Pagan .......................... | 713/300 |
| 2002/0169949 | A1* | 11/2002 | Shenassa et al. ............... | 713/1 |
| 2006/0069904 | A1* | 3/2006 | Hatakeyama ................... | 713/1 |
| 2006/0136704 | A1* | 6/2006 | Arendt et al. .................. | 713/2 |

OTHER PUBLICATIONS

HelpWithWindows.com, "Windows 98, Getting Started: Using ScanReg—Help With Windows.com," Last updated: Mar. 6, 2001, 3 pp. [Online] http://www.helpwithwindows.com/windows98/start-145.html.
Jonsson, S, International Search Report, PCT/US2006/013945, Sep. 19, 2006, p. 1-2.
Anonymous, "Startup Items List", Aug. 12, 2002, p. 1-13, XP-002397397, retrieved from: http://web.archive.org/web/20020812123145/http://www.3feetunder.com/krick/startup/list.
Spector, Lincoln, "Windows Rejuvenated", PC World, Jan. 31, 2005, p. 1-7, XP-002397398, retrieved from: http://www.pcworld.com/article/id, 119266/printable.html.
Bibo, Terry, "Reviews of Absolute StartUp Manager", Feb. 10, 2005, p. 1-2, XP-002397399, retrieved from http://web.archive.org/web/20050210181919/http://www.absolutestartup.com.
Nelson, Tom, et al, "Solve Performance Problems", PC Today, Oct. 2004, p. 1-5, XP-002397400, retrieved from http://www.pctoday.com/Editorial/article.asp?article=articles/2004.
Anonymous, "Ksoft Startup Select Windows Startup Manager", May 7, 2004, p. 1-2, XP-002397401, retrieved from http://web.archive.org/web/20040507023635/http://www.dummysoftware.
Rankin, Bob, "Make Windows XP Run Faster!", Sep. 6, 2005, p. 1-5, XP-002397402, retrieved from http://www.askbobrankin, com/make_windows_xp_run_faster.html.

* cited by examiner

Primary Examiner—Rehana Perveen
Assistant Examiner—Michael J Brown

(57) ABSTRACT

A method and system of changing a startup list of programs to determine whether performance of a computer system increases. Some illustrative embodiments are a processor-based method comprising changing a startup list of programs from a first list of programs to a predetermined list of programs, rebooting the computer system and loading programs from the startup list comprising only programs of the predetermined list, and then determining whether performance of the computer system improves.

20 Claims, 2 Drawing Sheets

METHOD AND SYSTEM OF CHANGING A STARTUP LIST OF PROGRAMS TO DETERMINE WHETHER COMPUTER SYSTEM PERFORMANCE INCREASES

BACKGROUND

Consumer computer system performance tends to degrade over time. While performance degradation in some cases is attributable to hardware malfunctions, in most cases computer system performance degradation is a software issue. As a computer system user updates existing application programs, or replaces existing application programs with newer versions, the updates and/or newer versions usually represent increased functionality but with higher code complexity. Thus, the newer versions with increased functionally may appear to operate slower than the earlier versions. Notwithstanding the increases in complexity, over time consumer computer systems tend to increase in the overall number of application programs on the machine. Thus, even if complexity is held constant, the large number of application programs executed by the computer system, and in particular the number of application programs automatically started with each boot of the computer system, make the computer system appear to experience performance degradation.

In some cases, a computer system user may unintentionally or inadvertently install additional programs, such as the class of parasitic programs known as "spyware." Such spyware programs may be loaded on the computer system without the user's knowledge, or programs that the user desires to be loaded may be accompanied by spyware-type programs. An increasing number of unwanted and/or unapproved programs may also manifest in the form of performance degradation of the computer system.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Various embodiments of the invention were developed in the context of computer systems implementing operating systems produced by Microsoft Corporation, such as Windows® 98 and Windows® XP. Thus, the description of the various embodiments is based on the specific developmental context; however, the various embodiments are also applicable to other (non-Microsoft) operating systems, and to after-developed operating systems.

Figure 1:
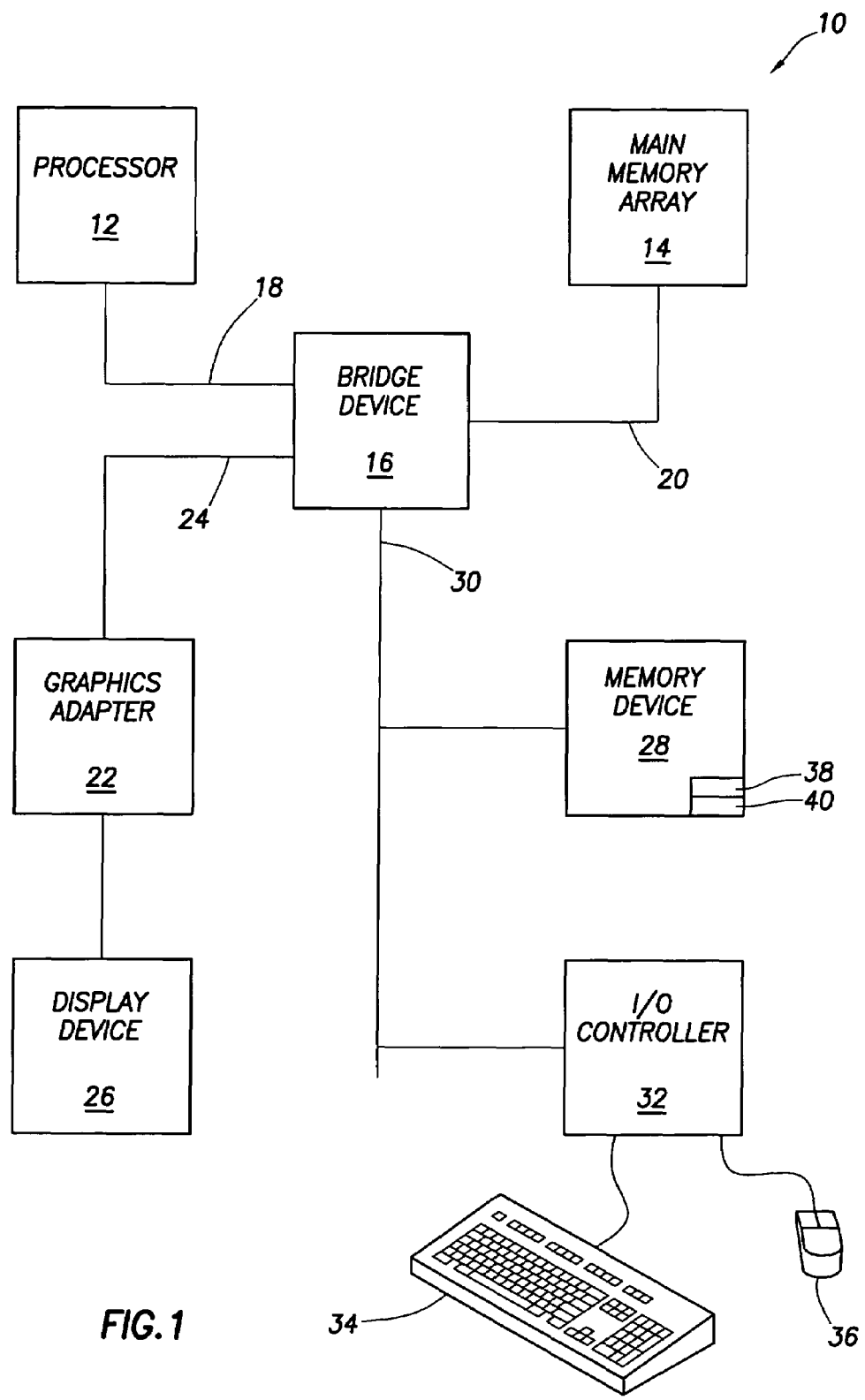
FIG. 1 illustrates a computer system constructed in accordance with embodiments of the invention.

FIG. 1 illustrates a computer system 10 constructed in accordance with at least some embodiments of the invention. In particular, computer system 10 comprises a processor 12 coupled to a main memory array 14 by way of a bridge device 16. The processor 12 may be any currently available or after-developed processor. Main memory array 14 is a random access memory (RAM) possibly in the form of a single RAM device, or an array of RAM devices. Bridge device 16 couples to the processor 12 by way of a host bus 18, and to the main memory array 14 by way of a memory bus 20. The bridge device 16 controls the processor's access to the main memory array 14.

Computer system 10 further comprises a graphics adapter 22 coupled to the processor 12 by way of bridge device 16. In some embodiments, the graphics adapter 22 couples to the bridge device by way of an Advanced Graphics Port (AGP) bus 24, although any currently available or after-developed bus system may be used. The graphics adapter 22 receives graphics primitives generated by a program executing on the processor 12, and translates those graphics primitives into images suitable for display on the display device 26.

Still referring to FIG. 1, processor 12 also couples to one or more long term storage devices, such as memory device 28, by way of bridge device 16 and an expansion bus 30. In accordance with at least some embodiments of the invention, the memory device 28 is a disk drive or other source of non-volatile memory storage. Expansion bus 30 may be any suitable expansion bus, such as a Peripheral Component Interconnect (PCI) bus. Although FIG. 1 shows the processor 12 coupled to the memory device 28 by way of a single bridge device 16, there may be one or more bridge devices through which the processor couples to the memory device 28.

So that programs executing on processor 12 may receive input from a user, the illustrative computer 10 further comprises an Input/Output (I/O) controller 32 which couples to the processor 12 through the bridge device 16. The I/O controller 32, in turn, couples one or more interface devices, such as the illustrative keyboard 34 and pointing device 36.

Computer systems in accordance with at least some of the illustrative embodiments of the invention utilize an operating system program. When the computer system 10 is powered down, the operating system programs are stored on the memory device 28. As the computer system 10 is booted, portions of the operating system are copied to and executed from the main memory array 14.

After the operating system is loaded, various application programs are automatically loaded by the computer system. In some operating environments, some of these programs are given icons in the "system tray," a small box in the lower right-hand corner of the start menu toolbar. For example, desirable programs such as firewall programs, virus detection programs, printer control programs, and programs to accept commands from the scroll wheel on pointing devices, may be automatically started and have icons in the system tray. Such operating systems keep a list of programs to be automatically started on each boot of the computer system in a series of files known as the "registry." Inasmuch as the registry comprises not only a list of programs to start on each boot up, but also various system configuration files, the portion of the registry containing the list of programs automatically loaded on each boot up will be equivalently referred to herein as the startup list, startup registry and/or startup registry list. In an illustrative computer system 10 using a Windows® XP operating system, the startup registry may be located at:

My Computer\HKEY_LOCAL_MACHINE\Software\
Microsoft\Windows\Current Version\Run

In the Windows® XP environment, the registry directories and files are hidden, and thus may only be observed by way of a special utility, such as a registry edit (REGEDIT) utility and/or a configuration (MSCONFIG) utility. FIG. 1 illustrates the startup registry list 38 as part of the memory device 28, with the understanding that all or part of the registry may be copied to the main memory 14 when actually in use.

Although a computer system user may intentionally add a program identifier to the startup registry when loading a new application program, at other times program identifiers may be added to the startup registry without the user's consent, or as an unwanted feature of an otherwise desirable application program loaded by the user.

Various embodiments of the invention are directed to a software utility, and a computer system implementing a software utility, that enables a computer system user, possibly under the direction of a help center technician, to evaluate whether a degradation in computer system performance is attributable to the number and/or types of programs in the startup registry. In particular, and referring to FIG. 1, various embodiments of the invention make use of a predetermined list 40, stored on a memory device 28 and possibly copied to the main memory array 14 when in use. In some embodiments, the predetermined list 40 represents the state of the startup registry when the computer system 10 left the manufacturer—when the computer was new. In other embodiments, the predetermined list 40 is a list of programs approved by the manufacturer, and which the manufacturer supports, to be present on the startup registry.

Figure 2:
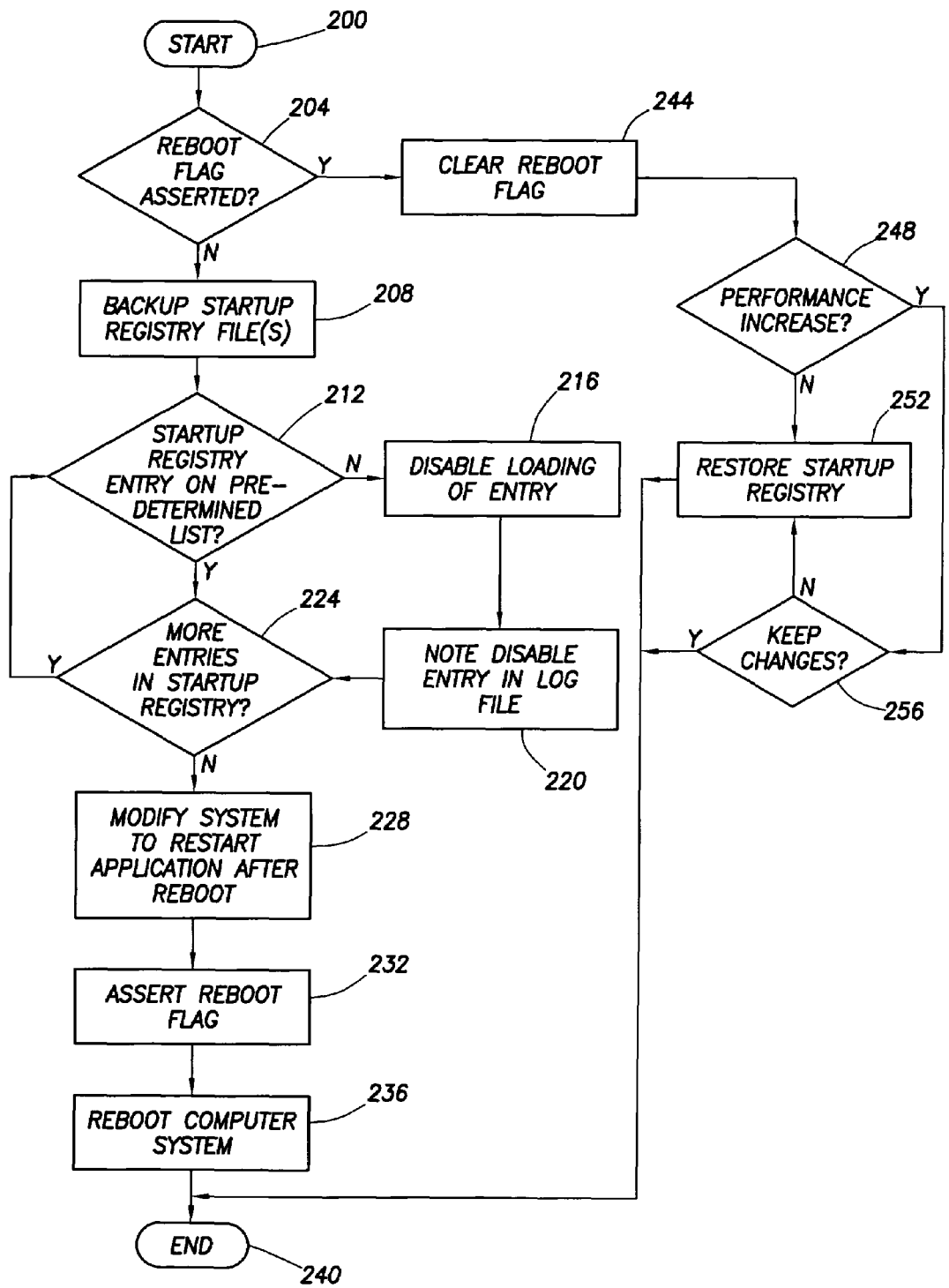
FIG. 2 illustrates a flow diagram of a method in accordance with embodiments of the invention.

FIG. 2 illustrates a flow diagram of a method that may be implemented by a utility program in accordance with embodiments of the invention. In particular, the process starts (block 200) and proceeds to a determination of whether a reboot flag has been previously asserted (block 204). The purpose of the decision (block 204) and the reboot flag is to enable a divergent program path when the illustrative method of FIG. 2 is entered for a second time after a reboot of the machine (discussed more fully below). If the reboot flag is not asserted, backup of the startup registry file or files occurs (block 208). In particular, a copy is made of the startup registry file and placed at a known location. Additionally in some embodiments, the operating system may comprise a list of programs that were at one time on the startup registry, but have been removed from the startup registry by way of a utility, such as MSCONFIG. For the illustrative Windows® XP operating system, the previously removed registry entries may be stored at My Computer\HKEY_LOCAL_MACHINE\Software\
Microsoft\Shared Tools\MCCONFIG\startupreg Thus, in these embodiments a backup copy of this list may also be made, and stored at the known location. The purpose of the backup copies is to enable restoring the various startup registries.

Still referring to FIG. 2, an entry in the startup registry is compared to the entries in the predetermined list (block 212). If the entry under scrutiny is not contained on the predetermined list, then that particular entry is disabled from loading (block 216). In accordance with at least some embodiments of the invention, disabling the loading of the particular entry comprises deleting the entry from the startup registry. In alternative embodiments, disabling the loading also involves placing the disabled entry in the registry file of previously removed register entries. Thereafter, the disabling of an entry in the startup registry is noted in a log file (block 220) and there is a determination of whether there are more entries in the startup registry (block 224). Conversely, if the entry in the startup registry is also present on the predetermined list (again block 212), then the process moves directly to a determination of whether there are more entries on the startup registry that have yet to be analyzed (again block 224). In alternative embodiments, the startup registry is completely cleared, possibly by having no entries on the predetermined list. In yet further alternative embodiments, all or substantially all the entries of startup registry are replaced without comparison with the entries of the predetermined list.

After all the entries have been analyzed, and possibly some entries disabled, the computer system is modified to restart the program implementing the illustrative method of FIG. 2 after a reboot of the computer system (block 228). In accordance with illustrative embodiments implementing Windows® 98 or Windows® XP operating systems, modifying the system to restart the utility program after a reboot involves placing an entry identifying the utility program in the registry under the "RunOnce" directory (having the same path as the Run the program implementing directory noted above). Thereafter, the reboot flag is asserted (block 232) and the illustrative method of FIG. 2 reboots the computer system (block 236), such as by issuing a warm boot command. Issuing a warm boot command effectively ends (block 240) this aspect of the illustrative flow diagram, although it will be understood that the ending in this case is caused by the reboot, and not necessarily the program reaching a particular end point.

Still referring to FIG. 2, because, before the reboot, the utility program configured the computer system to run again the utility program (block 228), after the reboot of the computer system the utility program is again started (block 200), followed by a determination of whether the reboot flag has been asserted (block 204). In this case, the utility program executed before the reboot of the computer system also asserted the reboot flag (block 232), and thus the utility program takes a divergent path than that previously described. In particular, the utility program clears the reboot flag (block 244) and makes a determination of whether the computer system experienced a performance improvement (block 248).

In accordance with at least some embodiments of the invention, the determination of whether there has been a performance improvement (block 248) is completed automatically by the computer system based on objective criteria. For example, the determination of whether there was a performance improvement may be based on the amount of time needed to boot the computer system, or some form of multi-program benchmarking that evaluates not only the speed at which a single program operates, but also evaluates the computer system's ability to operate multiple application programs, and to switch between them. In other embodiments, the determination may involve (alone or in combination with the objective criteria) prompting the computer system user for a subjective opinion as to the performance of the computer system. In these embodiments, a dialog box is posted posing the question, "Did performance improve?", and including a "yes" button and a "no" button.

If no performance improvement is experienced, the next step is to restore the startup registry (block 252). That is to say, if the reduced startup registry created by selectively disabling various, or all, entries in the original startup registry produced no appreciable performance increase, then the performance degradation experienced by the computer system may have other causes. Restoring the startup registry involves replacing the modified or changed startup registry with the copies made of the startup registry files (in illustrative block 208) or the notations made regarding each disabled entry (created at block 220). Thereafter, the process ends (block 240).

If, on the other hand, the computer system experiences an appreciable improvement in performance when booted with the reduced number of entries in the startup registry, then a user is prompted to decide whether to keep the changes to the startup registry (block 256). If the user elects not to keep the changes, the process moves to restoring the startup registry (block 252) from the backup files previously created, and the process ends. If the user elects to leave the startup registry in its modified state, then the process ends (block 240).

In the event the computer system user elects to leave the startup registry in its modified state, the user may nonetheless wish to enable at least some of the previously disabled entries of the startup registry. In some Windows® 98 or Windows® XP, the computer system user may utilize Windows®-based utilities to selectively enable previously disabled entries to the startup registry. In particular, the MSCONFIG utility enables the user to selectively enable and disable entries from the startup registry. In embodiments of the invention that segue into the selective return of some of the startup registry entries, the disabling of loading of a particular entry is accomplished by moving that entry to the "STARTUPREG" registry, as discussed above. In alternative embodiments, the utility application, such as that described with respect to FIG. 2, may implement its own MSCONFIG-type functionality enabling a user to selectively add entries to the startup registry from either the backups created (at block 208) or from a list of removed entries (created at block 220).

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention, and/or to create a computer-readable media storing a software program to implement the method aspects of the invention.

What is claimed is:

1. A processor-based method comprising:
   changing a startup list of programs from a first list of programs to a predetermined list of programs;
   rebooting the computer system and loading programs from the startup list comprising only programs of the predetermined list; and then
   determining whether performance of the computer system improves; and
   restoring at least some of entries of the first list to the startup list.

2. The processor-based method as defined in claim 1 further comprising restoring the first list of programs to the startup list.

3. The processor-based method as defined in claim 1 wherein changing further comprises changing the startup list to the predetermined list corresponding to a list of programs on a startup list when the computer system left the manufacturer.

4. A processor-based method comprising:
   changing a startup list of programs from a first list of programs to a predetermined list of programs approved by the manufacture of the computer system;
   rebooting the computer system and loading programs from the startup list comprising only programs of the predetermined list; and then
   determining whether performance of the computer system improves.

5. A processor-based method comprising:
   changing a startup list of programs from a first list of programs to a predetermined list of programs by:
      comparing each program identifier of each startup list entry to the predetermined list; and
      disabling loading of each program corresponding to a program identifier of the startup list not found on the predetermined list;
   rebooting the computer system and loading programs from the startup list comprising only programs of the predetermined list; and then
   determining whether performance of the computer system improves.

6. A processor-based method comprising:
   changing a startup list of programs from a first list of programs to a predetermined list of programs;
   rebooting the computer system and loading programs from the startup list comprising only programs of the predetermined list; and then
   determining whether performance of the computer system improves by prompting a user of the computer system for a subjective opinion of performance.

7. A computer system comprising:
   a processor; and
   a memory device coupled to the processor, the memory device stores a startup registry and a predetermined list of programs;
   wherein the processor, executing a program, changes the startup registry to be the same as the predetermined list to create a changed registry, and determines whether performance of the computer system improved when booting using the changed registry; and
   wherein the processor, executing a program, restores at least some of entries of the startup registry.

8. The computer system as defined in claim 7 wherein when the processor restores, the processor restores the startup registry to its state before the change to the change register.

9. The computer system as defined in claim 7 wherein the processor, executing a program, reboots the computer system and loads programs from the changed registry.

10. The computer system as defined in claim 7 wherein the processor, executing a program, changes the startup registry to the changed registry corresponding to a list of programs on a startup registry when the computer system left the manufacturer.

11. A computer system comprising:
    a processor; and
    a memory device coupled to the processor, the memory device stores a startup registry and a predetermined list of programs approved by the computer system manufacturer;
    wherein the processor, executing a program, changes the startup registry to be the same as the predetermined list to create a changed registry, and determines whether performance of the computer system improved when booting using the changed registry.

12. A computer system comprising:
a processor; and
a memory device coupled to the processor, the memory device stores a startup registry and a predetermined list of programs;
wherein the processor, executing a program, changes the startup registry by comparing each program entry of the startup registry to the predetermined list, and disables loading of each program corresponding to a program entry of the startup registry not found on the predetermined list; and
wherein the processor determines whether performance of the computer system improved when booting using the changed registry.

13. A computer system comprising:
a processor; and
a memory device coupled to the processor, the memory device stores a startup registry and a predetermined list of programs;
wherein the processor, executing a program, changes the startup registry to be the same as the predetermined list to create a changed registry, and determines whether performance of the computer system improved when booting using the changed registry; and
wherein the processor, executing a program, determines whether performance of the computer system improves by prompting a user of the computer system for a subjective opinion of performance.

14. A computer-readable media storing a program that, when executed by a processor, causes the processor to:
make a copy of a startup registry;
change the startup registry to a predetermined list of programs to create a changed startup registry;
reboot the computer system which loads programs from the changed startup registry; and
determine whether performance of the computer system improves when booting using the changed startup registry.

15. A computer-readable media storing a program that, when executed by a processor, causes the processor to:
change a startup registry to a predetermined list of programs to create a changed startup registry;
reboot the computer system which loads programs from the changed startup registry; and
prompt a user for a subjective opinion of performance and thereby determine whether performance of the computer system improves when booting using the changed startup registry.

16. A computer-readable media storing a program that, when executed by a processor, causes the processor to:
change a startup registry to a predetermined list of programs to create a changed startup registry, when the processor changes the startup registry, the program further causes the processor to:
compare each program entry of the startup registry to the predetermined list; and
disable loading of a program if a corresponding program entry of the startup registry is not found on the predetermined list;
reboot the computer system which loads programs from the changed startup registry; and
determine whether performance of the computer system improves when booting using the changed startup registry.

17. A computer system comprising:
a means for executing instructions; and
a means for storing programs and instructions coupled to the means for executing instructions, the means for storing stores a startup registry file and a predetermined list of programs approved by the computer system manufacturer;
wherein the means for executing instructions changes a startup registry file to be the same as the predetermined list of programs to create a changed registry file, and determines whether performance of the computer system improves when booting using the changed registry file.

18. A computer system comprising:
a means for executing instructions; and
a means for storing programs and instructions coupled to the means for executing instructions, the means for storing stores a startup registry file and a predetermined list of programs file;
wherein the means for executing instructions changes a startup registry file to be the same as the predetermined list of programs file to create a changed registry file, and determines whether performance of the computer system improves when booting using the changed registry file; and
wherein the means for executing determines whether performance of the computer system improves after rebooting by prompting a user of the computer system for a subjective opinion of performance.

19. The computer system as defined in claim 18 wherein the means for executing is further configured to reboot the computer system and load programs from the changed registry file.

20. The computer system as defined in claim 18 wherein the means for executing changes the startup registry file to the changed registry file corresponding to a list of programs on a startup registry file when the computer system left the manufacturer.

* * * * *